Oct. 27, 1953     R. S. COFFMAN     2,656,950
SAFETY PRESSURE DEVICE
Filed Aug. 23, 1950
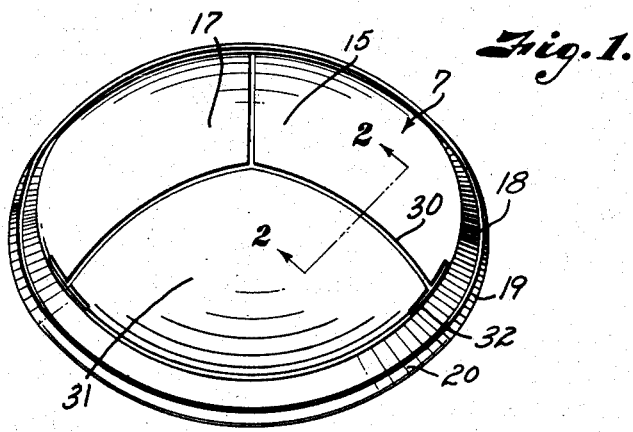
Fig.1.
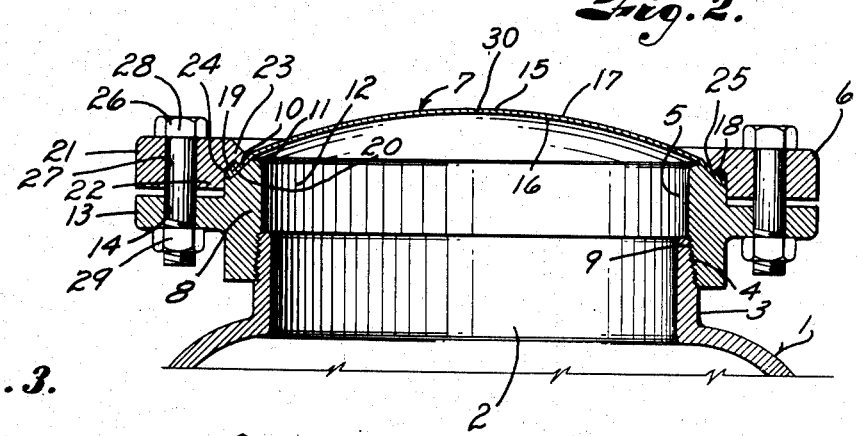
Fig.2.
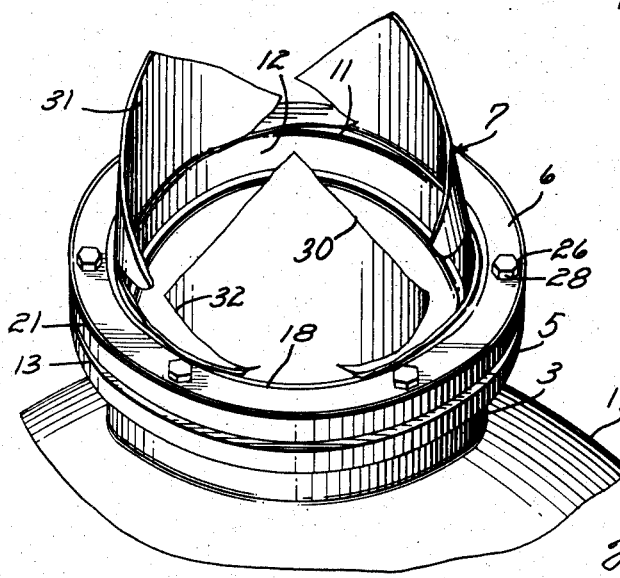
Fig.3.
Fig.4.
INVENTOR.
Robert S. Coffman
BY
Fishburn & Mullendore
ATTORNEYS Patented Oct. 27, 1953

2,656,950

UNITED STATES PATENT OFFICE 2,656,950

SAFETY PRESSURE DEVICE

Robert S. Coffman, Kansas City, Mo., assignor to Black, Sivalls & Bryson, Inc., Kansas City, Mo., a corporation of Delaware Application August 23, 1950, Serial No. 180,937

2 Claims. (Cl. 220—89)

This invention relates to safety pressure devices of the type disclosed in United States Letters Patent No. 1,930,960, granted to Gwynne Raymond, October 17, 1933. A safety device as disclosed in the Raymond patent must be formed of the more expensive metals and accurately formed as to thickness and shape to be substantially free of striations and other surface defects. Another difficulty is the critical formation of the clamping flanges and diaphragm so as to avoid alteration in the bursting pressure by stretching or shearing of the metal on edges of the clamping members. Should striations exist in the metal of the diaphragms the diaphragms tend to break apart on the striations with the result that segments fly away under bursting pressures and cause hazards. Definite bends in the diaphragm flanges likewise weaken the metal so that under pressure the metal tends to fracture with the result that the diaphragms rupture under pressures below the rated pressure.

It is the principal object of the present invention to overcome these difficulties and permit formation of a satisfactory diaphragm from less expensive metals.

Other objects of the invention are to provide a diaphragm with preformed scores which intersect the striations and form definite lines of fracture to the exclusion of fractures along the striations; to provide simple clamping flanges and a diaphragm rim for securely retaining the diaphragm in position without requiring the critical curvatures and surfaces of the diaphragms heretofore constructed.

In accomplishing these and other objects of the invention hereinafter pointed out, I have provided improved structure, the preferred form of which is illustrated in the accompanying drawing wherein:

Fig. 1 is a perspective view of a safety diaphragm embodying the features of the present invention.

Fig. 2 is a sectional view through the diaphragm and its clamping members.

Fig. 3 is a perspective view of the safety device showing the diaphragm ruptured along the preformed score so that the parts remain intact and do not fly away in space.

Fig. 4 is an enlarged section through the diaphragm on the line 2—2 of Fig. 1, showing one of the scores therein.

Referring more in detail to the drawing:

1 designates, for example, a vessel such as used in retaining a pressure fluid and which has a safe working pressure within which the fluid pressure must be retained and relieved when the pressures become excessive or approach the limits in the safety factor of the vessel. The vessel is therefore provided with a relief opening 2 encircled by a collar 3 having external threads 4 for mounting a diaphragm clamping member 5. The diaphragm clamping member 5 cooperates with a clamping member 6 to retain a frangible diaphragm 7 in closing relation with the opening 2 for retaining normal working pressures in the vessel.

The clamping member 5 includes a ring-like body 8 having internal threads 9 engaging the external threads 4 of the collar 3. The upper portion of the ring-like body terminates in a downwardly and outwardly sloping annular seat 10 rounding as at 11 into the inner face 12 of the member. While the portion 11 is preferably rounded as described, the shape thereof is not critical and the curvature may vary as desired. Extending outwardly below the seat 10 is an annularly extending lateral flange 13 having a circular series of apertures 14 for attaching the member 6 as later described.

The diaphragm 7 may be formed of sheet metal which may have been rolled to its desired thickness, and shaped in a press to form a concavo-convex dome portion 15 for closing the relief opening 2 with the concave side 16 being subject to pressure of the vessel and the outer convex side 17 subject to external pressure. The outer marginal or flange portion 18 of the diaphragm is slightly flanged to conform with the angle of the seat 10 and has a reversely turned rim portion 19 to reinforce the flange portion 18 of the diaphragm and cooperate with the member 6 in securely retaining the diaphragm on the seat 10. The reversely turned rim 19 is shown as of less width than the width of the seat 10 so that a portion of the diaphragm flange may be directly clamped against the seat 10 by a part of the clamping member 6 while the reversely bent rim is clamped by another portion as shown in Fig. 2. The reversely bent rim is preferably spot welded as at 20 to the underlying portion of the diaphragm flange at points around the periphery thereof so as to reinforce and strengthen the weakened metal caused by reverse bending thereof.

The clamping member 6 includes a ring-like body 21 having a portion 22 encircling the body portion 8 of the clamping member 5 and an inner portion 23 lapping the diaphragm flange. The portion 23 includes a groove 24 to accommodate the reversely turned rim 19 and provides an offset bearing face 25 which engages over the body of the flange and presses the diaphragm into sealing engagement with the seat 10. The member 6 is secured to the member 5 by fastening devices such as bolts 26 that extend through openings 27 therein which register with the openings 14 in the flange 13 and have heads 28 and nuts 29 for drawing the clamping members 5 and 6 together in clamping contact with the flange of the diaphragm. With this construction the diaphragm may be completely preformed and free of any internal stress caused by clamping thereof.

When the diaphragm is constructed of ordinary sheet metal the rollers used in forming the metal in sheets produce striations in the surface thereof which ordinarily provide points of fracture on which the diaphragm bursts with the result that portions of the diaphragm fly away in space under force of the escaping fluid. However, this hazard is avoided in the present invention by providing the dome portion of the diaphragm with definite scores 30 extending transversely across the striations and on which the dome portion of the diaphragm separates into substantially triangular segments 31.

In order to facilitate bending of the segments outwardly after tearing of the metal along the lines of score, the diaphragm is preferably provided with lateral transverse scores 32 near the juncture of the dome portion with the clamping flange of the diaphragm as best shown in Fig. 1. Then, when the pressure acting on the concave side of the diaphragm causes the metal to tear along the scores 30 the metal will tear along the lateral scores and cause complete opening of the diaphragm to the full capacity of the relief opening 2.

The scores 30 and lateral scores 32 are preferably formed on the convex side of the diaphragm as shown in Fig. 4, with the scores 30 arranged radially from the center thereof. Thus, the segments of the dome portion of the diaphragm remain intact and are not broken away by the sudden rush of pressure.

To install the diaphragm the clamping member 5 is applied to the collar 3 after which the diaphragm is applied with the flange thereof engaging the seat 10.

The clamping ring 6 is then placed over the dome portion of the diaphragm so that the clamping faces thereof engage the reversely bent rim 19 and flange portion of the diaphragm respectively to clamp the flange of the diaphragm against the seat 10 when the bolts 26 are applied and the nuts drawn tight against the flange 13. Since the thickness of the diaphragm has been calculated and the scores made of definite depth, the diaphragm will fracture within close limits of the calculated maximum safe pressure in the vessel so that the segments 31 formed between the striations open outwardly and bend retractively as the metal parts on the transverse scores 32 as shown in Fig. 3, under the release pressure to assure full opening and sufficiently rapid discharge of the pressure to avoid possibility of bursting of the vessel 1.

What I claim and desire to secure by Letters Patent is:

1. A safety device including, a clamping member having an annular beveled seat forming a clamping face encircling a flow opening in said member, a concavo-convex frangible diaphragm covering the flow opening and having an outwardly flaring annular flange substantially conforming to the clamping face and having a rim portion reversely turned into contact with the outer face side of said flange and forming an annular shoulder intermediate the width of said flange and offset annular surfaces, a clamping ring encircling the diaphragm and having an inner annular flange conforming with the bevel of said seat to provide a clamping face, said clamping face on the side of said rim portion being provided with an annular groove for containing said rim portion therein and forming offset annular surfaces to seat against the offset surfaces of the flange of the diaphragm, said groove also forming an annular shoulder facing in the direction of the concavo-convex portion of the diaphragm to engage with the shoulder on said diaphragm flange, and fastening means interconnecting the clamping members for maintaining clamping contact of said offset surfaces and said reversely turned rim portion pressed against the flange of the diaphragm.

2. A safety device including a clamping member having an annular beveled seat forming a clamping face encircling a flow opening in said member, a concavo-convex frangible diaphragm covering the flow opening and having an outwardly flaring annular flange substantially conforming to the clamping face and having a rim portion reversely turned into contact with the outer face side of said flange and forming an annular shoulder intermediate the width of said flange and offset annular surfaces, a clamping ring encircling the diaphragm and having an inner annular flange conforming with the bevel of said seat to provide a clamping face, said clamping face on the side of said rim portion being provided with an annular groove for containing said rim portion therein and forming offset annular surfaces to seat against the offset surfaces of the flange of the diaphragm, said groove also forming an annular shoulder facing in the direction of the concavo-convex portion of the diaphragm to engage with the shoulder on said diaphragm flange, and fastening means interconnecting the clamping members for maintaining clamping contact of said offset surfaces and said reversely turned rim portion pressed against the flange of the diaphragm, said concavo-convex portion of the diaphragm having radial grooves intersecting each other at the apex of said concavo-convex portion and having arcuate grooves extending transversely of the radial grooves and concentrically with the reversely turned rim with ends of the arcuate grooves spaced apart to maintain attachment of the portions of the diaphragm contained between the radial grooves when the diaphragm fractures along said grooves.

ROBERT S. COFFMAN.

References Cited in the file of this patent

UNITED STATES PATENTS

| Number | Name | Date |
|---|---|---|
| 1,502,444 | Stillwaggon | July 22, 1924 |
| 2,123,662 | Raymond | July 12, 1938 |
| 2,309,856 | Mason | Feb. 2, 1943 |
| 2,548,744 | Simms | Apr. 10, 1951 |

FOREIGN PATENTS

| Number | Country | Date |
|---|---|---|
| 129,460 | Great Britain | July 17, 1919 |